US008535433B2

(12) United States Patent
Boer et al.

(10) Patent No.: US 8,535,433 B2
(45) Date of Patent: *Sep. 17, 2013

(54) SULPHUR CEMENT PRE-COMPOSITION AND PROCESS FOR PREPARING SUCH SULPHUR CEMENT PRE-COMPOSITION

(75) Inventors: Jochem Okke Boer, Amsterdam (NL); Cornelis Hamelink, Amsterdam (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 717 days.

This patent is subject to a terminal disclaimer.

(21) Appl. No.: 12/602,838

(22) PCT Filed: Jun. 4, 2008

(86) PCT No.: PCT/EP2008/056918
§ 371 (c)(1),
(2), (4) Date: May 6, 2010

(87) PCT Pub. No.: WO2008/148804
PCT Pub. Date: Dec. 11, 2008

(65) Prior Publication Data
US 2010/0242807 A1   Sep. 30, 2010

(30) Foreign Application Priority Data

Jun. 7, 2007  (EP) .................................... 07109787

(51) Int. Cl.
*C09D 1/00*   (2006.01)
(52) U.S. Cl.
USPC .............. 106/287.1; 106/287.13; 106/287.14; 106/287.15
(58) Field of Classification Search
USPC .............................. 106/287.1, 287.13–287.16
See application file for complete search history.

(56) References Cited

U.S. PATENT DOCUMENTS

| 4,164,428 A | 8/1979 | Simic ........................ 106/287.13 |
| 4,376,830 A | 3/1983 | Nimer et al. ................... 501/140 |
| 6,194,594 B1 | 2/2001 | Görl et al. ..................... 556/427 |
| 7,833,341 B2 * | 11/2010 | Antens et al. ............... 106/287.1 |
| 8,137,456 B2 * | 3/2012 | Van Trier et al. ............. 106/815 |

FOREIGN PATENT DOCUMENTS

| GB | 2139202 | 11/1984 |
| JP | 10114565 | 5/1998 |
| WO | WO2007065920 | 6/2007 |

OTHER PUBLICATIONS

International Search Report dated Sep. 8, 2008 International Application No. PCT/EP2008/056918.
Nasir M et al: Effect of gamma mercaptopropyltrimethoxysilane coupling agant on t90, tensile strength and tear strength of silica-filled ENR vulcanisated: European Polymer Journal, Permagon Press Lte, Oxford, GB. vol. 25, No. 3, 1989, pp. 267-273, XP002390492 ISSN 0014-3057 p. 267.

* cited by examiner

Primary Examiner — David M Brunsman
(74) Attorney, Agent, or Firm — Charles W. Stewart

(57) ABSTRACT

The present invention provides a sulphur cement precomposition, comprising sulphur and at least a polysulphide-containing organosilane in an amount of at least 0.3 wt % based on the weight of the total composition, which polysulphide-containing organosilane is of the general molecular formula:
$(X_3Si)_m H_{(2n+1-m)} C_n\text{-}S_a\text{-}C_{n'} H_{(2n'+1-m')}(SiX'_3)_{m'}$
wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

19 Claims, No Drawings

SULPHUR CEMENT PRE-COMPOSITION AND PROCESS FOR PREPARING SUCH SULPHUR CEMENT PRE-COMPOSITION

This application is a 371 filing of PCT/EP08/56918, filed Apr. 6, 2008.

The present application claims priority from European Patent Application 07109787.7 filed 7 Jun. 2007.

FIELD OF THE INVENTION

The present invention provides a sulphur cement pre-composition and a process for the preparation of a sulphur cement pre-composition. The invention further provides a process for the preparation of a sulphur cement product, a sulphur cement product and the use of such sulphur cement pre-composition in sulphur cement sulphur mortar or sulphur concrete.

BACKGROUND OF THE INVENTION

Sulphur cement generally refers to a product comprising at least sulphur and a filler. To improve the properties of the sulphur cement, the sulphur may be modified using a sulphur modifier. Such modifiers are known in the art.

Usual sulphur cement fillers are particulate inorganic materials.

Sulphur cement-aggregate composites generally refer to a composite comprising both sulphur cement and aggregate. Examples of sulphur cement-aggregate composites are sulphur mortar, sulphur concrete and sulphur-extended asphalt. Sulphur-extended asphalt is asphalt, i.e. typically aggregate with a binder that contains filler and a residual hydrocarbon fraction, wherein part of the binder has been replaced by sulphur, usually modified sulphur.

It is known to use organosilane compounds as a stabilising agent in sulphur cement or sulphur cement-aggregate compositions to improve water stability. In U.S. Pat. No. 4,164,428 for example, a modified sulphur composition (often referred to a plasticized sulphur composition) comprising at least 50% by weight of sulphur, a sulphur modifier (often referred to a sulphur plasticizer), a finely divided particulate mineral suspending agent, and an organosilane stabilising agent is disclosed. It is mentioned that suitable organosilanes have the general molecular formula R—Si(OR')$_3$, wherein R' is a low molecular weight alkyl group and R is an organic radical having at least one functional group, usually bonded to the silicon atom by a short alkyl chain. Gamma-mercaptopropyltrimethoxysilane is mentioned as a preferred organosilane.

In U.S. Pat. No. 4,376,830 a sulphur cement-aggregate composition comprising a sulphur cement and an aggregate containing an expansive clay and processes for preparing such compositions are disclosed. The processes, and resulting compositions, are characterised by the addition of certain organosilane compounds in the composition prior to solidifying (cooling) the composition. It is mentioned that suitable organosilanes have the formula Z—Si(R$^1$R$^2$R$^3$), wherein R$^1$, R$^2$ and R$^3$ may be lower alkoxy groups and Z is an organic radical attached to Si via a carbon atom and has at least one molten-sulphur reactive group. Z may for example be mercaptoalkyl. Gamma-mercaptopropyltrimethoxysilane is mentioned as a preferred organosilane. Gamma-mercaptopropyltrimethoxysilane is very toxic and has a very unpleasant smell. The resulting solidified composition has improved water stability. However, there is still room for improvement of the water stability of prior sulphur cement-aggregate composition.

SUMMARY OF THE INVENTION

It has now been found that a stabilizing agent chosen from a different group of organosilanes, i.e. polysulphide-containing organosilanes having at least two organosilyl groups, can be used to prepare sulphur cement products with improved water uptake behaviour. Additionally, it has been found that the prepared products have an improved strength compared to composites prepared using the prior art stabilizing agents. More importantly these new stabilizing agents allow for the preparation of a sulphur cement pre-composition from elemental sulphur and the stabilizing agent.

Accordingly, the present invention provides a sulphur cement pre-composition, comprising sulphur and at least a polysulphide-containing organosilane in an amount of at least 0.3 wt % based on the weight of the total composition, which polysulphide-containing organosilane is of the general molecular formula:

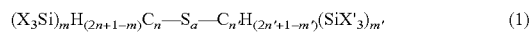

(1)

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

The invention in a further aspect provides a process for the preparation of a sulphur cement pre-composition, comprising admixing sulphur with at least a polysulphide-containing organosilane in an amount of at least 0.3 wt % based on the weight of the total composition to obtain a sulphur cement pre-composition, in which process the polysulphide-containing organosilane is of the general molecular formula:

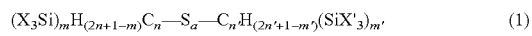

(1)

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

The invention in a further aspect provides a process for the preparation of a sulphur cement product comprising the following steps:

(a) admixing at least a sulphur cement pre-composition according to the invention and a particulate inorganic material at a temperature at which sulphur is molten to obtain a molten sulphur cement product; and (b) solidifying the molten sulphur cement product.

The invention in a still further aspect provides a sulphur cement product obtainable by a process for the preparation of a sulphur cement product according to the invention.

The invention in another aspect provides the use of a sulphur cement pre-composition according to the invention in sulphur cement, sulphur mortar, sulphur concrete or sulphur-extended asphalt.

Reference herein to a sulphur cement pre-composition is to a composition, which after addition of at least one of sulphur or a particulate inorganic material forms a sulphur cement product, e.g. a sulphur cement, a sulphur mortar, sulphur concrete and sulphur-extended asphalt.

An advantage of the use of a polysulphide-containing organosilane according to general formula (1) is that sulphur cement pre-composition can be prepared comprising the polysulphide-containing organosilane and sulphur. Such a sulphur cement pre-composition may contain high concentrations of polysulphide-containing organosilane. Suitably such a pre-composition is prepared separately and can be provided in relatively small volumes when needed.

Another advantage is that the sulphur cement pre-composition prepared using a polysulphide-containing organosilane according to general formula (1) provide the desired stabilising agent functionality when used in preparation of a sulphur cement product, such as sulphur cement or sulphur cement-aggregate composites.

A further advantage of the use of a polysulphide-containing organosilane according to general formula (1) as compared to the known use of gamma-mercaptopropyltrimethoxysilane as stabilising agent in sulphur cement products is that the water uptake of the sulphur cement product is significantly lower.

A still further advantage is that the sulphur cement product prepared according to the invention has improved mechanical properties as compared to sulphur cement products prepared with other organosilanes, for example gamma-mercaptopropyl-trimethoxysilane.

A still even further advantage of the use of a sulphur cement pre-composition based on a polysulphide-containing organosilane with at least two organosilyl groups is that it has a far lower toxicity than gamma-mercaptopropyl-trimethoxysilane and that it has no unpleasant smell.

DETAILED DESCRIPTION OF THE INVENTION

The sulphur cement pre-composition according to the invention comprises sulphur and at least a polysulphide-containing organosilane. The organosilane is a polysulphide-containing organosilane having at least two organosilyl groups having the general molecular formula:

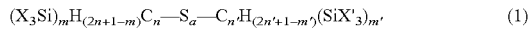

$$(X_3Si)_m H_{(2n+1-m)} C_n - S_a - C_{n'} H_{(2n'+1-m')} (SiX'_3)_{m'} \quad (1)$$

In general molecular formula (1), a is an integer in the range of from 2 to 8, preferably of from 2 to 6. X and X' each are, independently, a hydrolysable group, preferably a halogen, alkoxy, acyloxy or aryloxy group, more preferably a lower alkoxy group, even more preferably an alkoxy group with 1 to 4 carbon atoms, for example methoxy or ethoxy. n and n' each are, independently, an integer in the range of from 1 to 4, and m and m' each are, independently, an integer in the range of from 1 to (2n+1). Preferably n has the same value as n' and m preferably has the same value as m'. Preferably, m and m' both are 1 or 2, more preferably both m and m' are 1. X is preferably the same hydrolysable group as X'. Particularly preferred organosilanes are bis(3-triethoxysilylpropyl) tetrasulphide, bis(3-trimethoxysilylpropyl)disulphide, bis(3-trimethoxysilylpropyl)trisulphide, bis(3-trimethoxysilylpropyl)tetrasulphide.

The sulphur cement pre-composition may comprise the polysulphide-containing organosilane in any amount desired. Preferably, the sulphur cement pre-composition comprises at least 0.3 wt % of the polysulphide-containing organosilane based on the weight of the total composition. More preferably, the sulphur cement pre-composition comprises in the range of from 0.3 to 25 wt %, preferably, 0.5 to 10 wt %, more preferably 1 to 10 wt % of the polysulphide-containing organosilane based on the weight of the total composition. Such sulphur cement pre-composition may for instance be advantageously produced off-site and used on-site in small volumes. The sulphur cement pre-composition may contain a concentration of polysulphide-containing organosilane, which is higher than the concentration typically used in a process for preparing a sulphur cement product. When used on-site to prepare for instance a sulphur cement product, such a sulphur cement pre-composition may suitably be added in such amounts to an inorganic material that the need for stabilising agent is satisfied. The sulphur cement product may be completed by adding additional sulphur and other ingredients if not sufficiently present in the sulphur cement pre-composition. The sulphur cement pre-composition is typically solid under ambient conditions, in contrast to the generally liquid polysulphide-containing organosilane. The use of the sulphur cement pre-composition removes the need for transporting and on-site storing of polysulphide-containing organosilanes.

In addition, the sulphur cement pre-composition according to the invention may comprise a sulphur modifier. Typically, the sulphur cement pre-composition may comprise sulphur modifiers in an amount in the range of from 0.1 to 10 wt % based on the weight of sulphur. Such modifiers are known in the art. Examples of such modifiers are aliphatic or aromatic polysulphides or compounds that form polysulphides upon reaction with sulphur. Examples of compounds that form polysulphides are naphthalene or olefinic compounds such as 5-ethylidene-2-norbornene (ENB) or 5-vinyl-2-norbornene (VNB), dicyclopentadiene, limonene or styrene.

It will be appreciated that the polysulphide group of the polysulphide-containing organosilane and the sulphur may interact. However, such interactions do not effect the silane groups of polysulphide-containing organosilane.

The sulphur cement pre-compositions according to the invention may be used in solid or molten state, for instance to prepare a sulphur cement product.

The invention also provides a process for preparing a sulphur cement pre-composition according to the invention. In this process sulphur is admixed with at least the polysulphide-containing organosilane in an amount of at least 0.3 wt % based on the weight of the total composition, to obtain a sulphur cement pre-composition. The polysulphide-containing organosilane may be admixed with the sulphur by any means known in the art. The polysulphide-containing organosilane may first be dissolved in a small amount of solvent, for example an alcohol or a hydrocarbon, in order to facilitate the admixing with the sulphur. The solvent preferably has a boiling point such it evaporates during the admixing step.

Preferably, the sulphur and polysulphide-containing organosilane are admixed at a temperature at which sulphur is molten. Alternatively, the obtained sulphur cement pre-composition is heated and mixed at a temperature at which the sulphur is molten. The temperature at which sulphur is molten is typically above 120° C., preferably in the range of from 120 to 150° C., more preferably in the range of from 125 to 140° C.

Mixing at temperatures at which the sulphur is molten may provide a homogeneous distribution of the polysulphide-containing organosilane in the sulphur.

In case the sulphur and polysulphide-containing organosilane are admixed at a temperature at which sulphur is molten or the obtained sulphur cement pre-composition is heated and mixed at a temperature at which the sulphur is molten, the obtained sulphur cement pre-composition may be cooled to a temperature at which the sulphur solidifies. The solid sulphur cement pre-composition can be easily stored or transported.

As mentioned herein above the sulphur cement pre-composition can suitably be used to prepare a sulphur cement product. Reference herein to a sulphur cement product is to a sulphur cement or a sulphur cement-aggregate composite.

A sulphur cement typically refers to a composition comprising sulphur or modified sulphur and a filler. Usual sulphur cement fillers are particulate inorganic materials with an average particle size in the range of from 0.1 μm to 0.1 mm. The filler content of sulphur cement may vary widely, but is typically in the range of from 1 to 50 wt %, based on the total weight of the cement.

Sulphur cement-aggregate composites generally refer to a composite comprising both sulphur cement and a particulate inorganic material aggregate. Examples of sulphur cement-aggregate composites are sulphur mortar, sulphur concrete and sulphur-extended asphalt. Mortar comprises fine aggregate, typically with particles having an average diameter between 0.1 and 5 mm, for example sand. Concrete comprises coarse aggregate, typically with particles having an average diameter between 5 and 40 mm. Sulphur-extended asphalt is asphalt, i.e. typically aggregate with a binder that contains filler and a residual hydrocarbon fraction, wherein part of the binder has been replaced by sulphur, usually modified sulphur.

In the process for preparation of sulphur cement product according to the invention, a sulphur cement product is prepared by admixing in step (a) at least a sulphur cement pre-composition according to the invention and a particulate inorganic material at a temperature at which sulphur is molten to obtain a molten sulphur cement product. In step (b), after the admixing step (a), the molten sulphur cement product is allowed to solidify. Typically, solidification takes place by allowing the molten sulphur cement product to cool down to a temperature below the melt temperature of sulphur.

In step (a), a particulate inorganic material is admixed with the sulphur cement pre-composition. In case of a process for the preparation of sulphur cement, the inorganic material is an inorganic filler. In the case the process for preparing a sulphur cement product is used for the preparation of a sulphur cement-aggregate composite, the particulate inorganic material may be filler and aggregate. The particulate inorganic material that is admixed with the sulphur cement pre-composition in step (a) may be any particulate inorganic material known to be suitable as sulphur cement filler or aggregate. Preferably, the particulate inorganic material that is admixed with the sulphur cement pre-composition in step (a) has oxide or hydroxyl groups on its surface. Examples of suitable particulate inorganic materials are silica, fly ash, limestone, quartz, iron oxide, alumina, titania, carbon black, gypsum, talc or mica, sand, gravel, rock or metal-silicates. Such metal silicates are for example formed upon heating heavy metal containing sludge in order to immobilise the metals. More preferably the particulate inorganic material is a silica or a silicate. Examples of such silica or silicates are quartz, sand, metal-silicates (e.g. mica).

In the case that metal-silicates formed by heating sludge for heavy metal immobilisation are used as particulate inorganic material, the heat that is available in the heated sludge can advantageously be used in the sulphur cement product preparation process according to the invention. This can for example be done by using steam that is generated during cooling of the metal-silicates for heating the sulphur or the ingredients of the process according to the invention.

Step (a) is carried out at a temperature at which sulphur is molten, i.e. typically above 120° C., preferably in the range of from 120 to 150° C., more preferably in the range of from 125 to 140° C. The conditions under which the particulate inorganic material is admixed with the sulphur cement pre-composition are preferably such that the organosilane comprised in the sulphur cement pre-composition is allowed to react with the inorganic material. The reaction time is typically in the range of from 20 minutes to 3 hours, preferably of from 30 minutes to 2 hours.

Sulphur, and optionally further ingredients such as sulphur modifiers or particulate inorganic material, may be admixed with the sulphur cement pre-composition and the particulate inorganic material in step (a). Preferably, all ingredients of the sulphur cement product are admixed at a temperature at which sulphur is liquid.

The sulphur cement pre-composition is admixed with the particulate inorganic material in such amounts that the molten sulphur cement product comprises polysulphide-containing organosilanes in the range of from 0.01 to 0.2 wt %, preferably of from 0.02 to 0.1 wt %, based on the weight of particulate inorganic material. If the polysulphide-containing organosilanes have reacted, sulphur cement pre-composition is admixed in such an amount that an equivalent number of silane groups are present.

EXAMPLES

The invention is further illustrated my means of the following non-limiting examples.

Preparation of the Sulphur Cement Pre-Composition

The sulphur cement pre-composition was prepared by heating 99 parts by weight of sulphur and 1 part by weight of bis(3-triethoxysilylpropyl)tetrasulphide (TESPT, Ex Degussa) to a temperature of 140° C. while mixing continuously. Subsequently, the molten pre-composition was cooled to room temperature.

Mortar Preparation

Eight different samples were prepared. In the preparation of mortar 1, no organosilane was used. In the preparation of mortars 2 to 5, 7 and 8 sand was pretreated with an organosilane and in mortar 6 a sulphur cement pre-composition according to the invention was used.

Sulphur Mortar 1 (Not According to the Invention)

Sulphur mortar 1 was prepared by admixing 27.83 grams of dried sand (Normsand) as aggregate, 16.83 grams of quartz as filler and 10.35 grams of elemental sulphur. Sand, quartz and sulphur were mixed at 150° C. until an homogeneous mixture was obtained. The mixture was then pressed in a steel cylindrical mould that was pre-heated to 150° C. The thus-formed mortar cylinder was then demoulded. The cylinders had a diameter of 30 mm.

Sulphur Mortar 2 (Not According to the Invention)

As mortar 1, with the difference that the dried Normsand is first pre-treated with 0.0275 grams of 3-trimethoxysilylpropane-1-thiol (Ex Degussa). The 3-trimethoxysilylpropane-1-thiol is added to the sand. An amount of ethanol sufficient to completely wet the sand particles was added. The mixture was then dried at 70-80° C. until the ethanol was evaporated. The mixture was then heated to 130° C. and kept for one hour at that temperature in order to allow the 3-trimethoxysilylpropane-1-thiol to react with the sand. Liquid sulphur and quartz filler were added and admixed with the other ingredients for approximately 5 minutes at 150° C. Mortar cylinders were made as described above for mortar 1.

Sulphur Mortar 3 (Not According to the Invention)

As mortar 2, but now the sand is pre-treated with 0.0275 grams of 3-trimethoxysilylpropyl methacrylate (Ex Degussa) instead of 3-trimethoxysilylpropane-1-thiol.

Sulphur Mortar 4 (Not According to the Invention)

As mortar 2, but now the sand is pre-treated with 0.0275 grams TESPT of instead of 3-trimethoxysilylpropane-1-thiol.

Sulphur Mortar 5 (Not According to the Invention)

As mortar 4, but now 1057.5 grams of dried sand (Normsand) as aggregate, 630 grams of quartz as filler and 562.2 grams of elemental sulphur were used. The sand was pre-treated with 1.35 gram TESPT. The molten sulphur mortar was cast into a mould of 4 by 4 by 16 cm and allowed to cool to room temperature.

Sulphur Mortar 6 (According to the Invention)

427.5 gram of elemental sulphur was heated to 130° C. until all the sulphur was molten. Subsequently, 1057.5 gram of dried sand (Normsand), preheated to a temperature of 150° C., was added to the molten sulphur, while mixing until a homogeneous mixture was obtained. Then 630 gram of quartz, preheated to a temperature of 150° C., was added to the mixture as filler and mixing was continued until a homogeneous mixture was obtained. 135 gram of sulphur pre-composition was added to the homogeneous mixture and mixing was continued until a homogeneous mixture was obtained. The molten sulphur mortar was cast into a mould of 4 by 4 by 16 cm and allowed to cool to room temperature.

Sulphur Mortar 7 (Not According to the Invention)

Like sulphur mortar 4, but now the sand is pre-treated with 0.0330 grams TESPT.

Sulphur Mortar 8 (Not According to the Invention)

Like sulphur mortar 2, but now the sand is pre-treated with 0.0330 grams of 3-trimethoxysilylpropane-1-thiol.

EXAMPLES

Example 1

Water Absorption

Moulded samples of sulphur mortars 1 to 6 were immersed in water for 2 days. The mass increase was determined. In Table 1, the results are shown.

The mortars prepared with TESPT (mortars 4 to 6) have a significantly lower water uptake than mortars prepared with organosilanes with a single functionalised organosilyl group (mortars 2 and 3). It is believed that this reflects an improved bonding between filler/aggregate and sulphur. The water uptake of the sulphur mortars prepared using the sulphur cement pre-composition is comparable to the water uptake of sulphur cement products prepared by first applying TESPT to the sand prior to admixing sulphur.

TABLE 1

Water Absorption of Mortars 1 to 6

| Mortar | Organosilane | mass increase (%) |
|---|---|---|
| 1 | None | 0.73 |
| 2 | 3-trimethoxysilylpropane-1-thiol* | 0.14 |
| 3 | 3-trimethoxysilylpropyl methacrylate | 0.14 |
| 4 | TESPT coated on sand | <0.01 |
| 5 | TESPT coated on sand | <0.01 |
| 6 | TESPT in sulphur cement pre-composition | <0.01 |

*3-trimethoxysilylpropane-1-thiol is the IUPAC name for gamma-mercaptopropyltrimethoxysilane.

Example 2

Compression and Flexural Strength

The compressive strength under compression of moulded samples of mortars 5 to 8 were determined in a stress-controlled compression test using a Zwick controller TT0727 with a 300 kN load cell, a test speed of 2.4 kN/s, a pre-load of 119.64 kN and a pre-load speed of 2.4 kN/s. The compressive strength (in N/mm$^2$) is shown in Table 2.

The flexural strength (in N/mm$^2$) was determined in a three-point loading experiment with an increasing loading (0.05 kN/s). The results are shown in Table 2.

TABLE 2

Mechanical Properties of Sulphur Mortars

| Mortar | organosilane | Organosilane conc$^a$ (wt %) | compressive strength (N/mm2) | flexural strength (N/mm2) |
|---|---|---|---|---|
| 5 | TESPT on sand | 0.06 | 90.85 | 9.67 |
| 6 | TESPT in sulphur cement pre-composition | 0.06 | 93.07 | 9.79 |
| 7 | TESPT on sand | 0.07 | 80.7 | 15.1 |
| 8 | TMSP-1-thiol$^b$ | 0.07 | 70.0 | |

$^a$organolisane concentration in weight % based on the total weight of the composition
$^b$TMSP-1-thiol: 3-trimethoxysilylpropane-1-thiol

What is claimed is:

1. A sulphur cement pre-composition, comprising sulphur and at least a polysulphide-containing organosilane in an amount of at least 0.3 wt % based on the weight of the total composition, which polysulphide-containing organosilane is of the general molecular formula:

$$(X_3Si)_m H_{(2n+1-m)} C_n - S_a - C_n H_{(2n'+1-m')} (SiX'_3)_{m'} \quad (1)$$

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

2. A sulphur cement pre-composition according to claim 1, comprising in the range of from 0.3 to 25 wt % of polysulphide-containing organosilane based on the weight of the total composition.

3. A sulphur cement pre-composition according to claim 2, wherein the polysulphide-containing organosilane is bis(3-triethoxysilylpropyl)tetrasulphide.

4. A process for the preparation of a sulphur cement pre-composition according to claim 3, comprising admixing sulphur with at least a polysulphide-containing organosilane in an amount of at least 0.3 wt % based on the weight of the total composition to obtain a sulphur cement pre-composition, in which process the polysulphide-containing organosilane is of the general molecular formula:

$$(X_3Si)_m H_{(2n+1-m)} C_n - S_a - C_n H_{(2n'+1-m')} (SiX'_3)_{m'} \quad (1)$$

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

5. A process for the preparation of a sulphur cement pre-composition according to claim 2, comprising admixing sulphur with at least a polysulphide-containing organosilane in an amount of at least 0.3 wt % based on the weight of the total composition to obtain a sulphur cement pre-composition, in which process the polysulphide-containing organosilane is of the general molecular formula:

$$(X_3Si)_m H_{(2n+1-m)} C_n - S_a - C_n H_{(2n'+1-m')} (SiX'_3)_{m'} \quad (1)$$

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

6. A sulphur cement pre-composition according to claim 1, wherein the polysulphide-containing organosilane is bis(3-triethoxysilylpropyl)tetrasulphide.

7. A process for the preparation of a sulphur cement pre-composition according to claim 6, comprising admixing sulphur with at least a polysulphide-containing organosilane in an amount of at least 0.3 wt % based on the weight of the total composition to obtain a sulphur cement pre-composition, in which process the polysulphide-containing organosilane is of the general molecular formula:

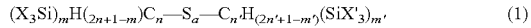  (1)

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

8. A process for the preparation of a sulphur cement pre-composition according to claim 1, comprising admixing sulphur with at least a polysulphide-containing organosilane in an amount of at least 0.3 wt % based on the weight of the total composition to obtain a sulphur cement pre-composition, in which process the polysulphide-containing organosilane is of the general molecular formula:

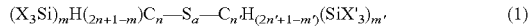  (1)

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

9. A process according to claim 8, wherein the sulphur and at least a polysulphide-containing organosilane are admixed at a temperature at which sulphur is molten.

10. A process for the preparation of a sulphur cement product comprising the following steps:
(a) admixing at least a sulphur cement pre-composition according to claim 1 and a particulate inorganic material at a temperature at which sulphur is molten to obtain a molten sulphur cement product; and
(b) solidifying the molten sulphur cement product.

11. A process according to claim 10, wherein in step (a) additional sulphur is admixed.

12. A process according to claim 10, wherein the sulphur cement pre-composition is admixed with the particulate inorganic material in such an amount that the molten sulphur cement product comprises polysulphide-containing organosilanes in the range of from 0.01 to 0.2 wt % based on the weight of particulate inorganic material.

13. A sulphur cement product obtainable by a process according to claim 10.

14. A sulphur cement pre-composition according to claim 1, comprising in the range of from 0.5 to 10 wt % of polysulphide-containing organosilane based on the weight of the total composition.

15. A sulphur cement pre-composition according to claim 14, wherein the polysulphide-containing organosilane is bis(3-triethoxysilylpropyl)tetrasulphide.

16. A process for the preparation of a sulphur cement pre-composition according to claim 14, comprising admixing sulphur with at least a polysulphide-containing organosilane in an amount of at least 0.3 wt % based on the weight of the total composition to obtain a sulphur cement pre-composition, in which process the polysulphide-containing organosilane is of the general molecular formula:

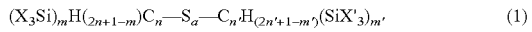  (1)

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

17. A sulphur cement pre-composition according to claim 1, comprising in the range of from 1 to 10 wt % of polysulphide-containing organosilane based on the weight of the total composition.

18. A sulphur cement pre-composition according to claim 17, wherein the polysulphide-containing organosilane is bis(3-triethoxysilylpropyl)tetrasulphide.

19. A process for the preparation of a sulphur cement pre-composition according to claim 17, comprising admixing sulphur with at least a polysulphide-containing organosilane in an amount of at least 0.3 wt % based on the weight of the total composition to obtain a sulphur cement pre-composition, in which process the polysulphide-containing organosilane is of the general molecular formula:

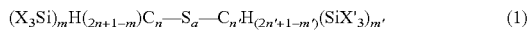  (1)

wherein a is an integer in the range of from 2 to 8, X and X' each are, independently, a hydrolysable group, n and n' each are, independently, an integer in the range of from 1 to 4, and m and m' each are, independently, an integer in the range of from 1 to (2n+1).

* * * * *